US012105476B2

(12) United States Patent
Braun

(10) Patent No.: US 12,105,476 B2
(45) Date of Patent: Oct. 1, 2024

(54) ADJUSTABLE LEVER OF A TOURBILLON MECHANISM AND A METHOD OF ADJUSTMENT

(71) Applicant: Glashütter Uhrenbetrieb GmbH, Glashütte/Sachsen (DE)

(72) Inventor: Tony Braun, Müglitztal (DE)

(73) Assignee: GLASHÜTTER Uhrenbetrieb GmbH, Glashütte/Sachsen (DE)

( * ) Notice: Subject to any disclaimer, the term of this patent is extended or adjusted under 35 U.S.C. 154(b) by 471 days.

(21) Appl. No.: 17/375,135

(22) Filed: Jul. 14, 2021

(65) Prior Publication Data

US 2022/0121153 A1 Apr. 21, 2022

(30) Foreign Application Priority Data

Oct. 19, 2020 (EP) .................................... 20202613

(51) Int. Cl.
*G04B 17/28* (2006.01)
*G04B 17/32* (2006.01)

(52) U.S. Cl.
CPC ........... *G04B 17/285* (2013.01); *G04B 17/32* (2013.01)

(58) Field of Classification Search
CPC .............................. G04B 17/285; G04B 17/32
See application file for complete search history.

(56) References Cited

U.S. PATENT DOCUMENTS

2004/0062149 A1* 4/2004 Geyer .................. G04B 27/004 368/127
2015/0301503 A1* 10/2015 Merdanovic .......... G04F 7/0804 368/238

FOREIGN PATENT DOCUMENTS

| | | | | |
|---|---|---|---|---|
| CH | 695223 A5 | | 1/2006 | |
| CN | 101846962 A | * | 9/2010 | |
| EP | 2871536 A1 | * | 5/2015 | ........... G04B 17/285 |
| EP | 2 871 536 B1 | | 9/2019 | |
| JP | 2004286744 A | * | 10/2004 | ........... G04B 17/285 |
| JP | 2005-512065 A | | 4/2005 | |
| JP | 2017161511 A | * | 9/2017 | ........... G04B 17/285 |

OTHER PUBLICATIONS

European Search Report of EP20202613 dated Mar. 18, 2021.

* cited by examiner

*Primary Examiner* — Edwin A. Leon
*Assistant Examiner* — Kevin Andrew Johnston
(74) *Attorney, Agent, or Firm* — Sughrue Mion, PLLC

(57) ABSTRACT

An adjustable lever (100) of a tourbillon mechanism for stopping at least one tourbillon unit (200). The adjustable lever (100) includes at least one first member (110) configured to be actuated, at least one second member (120) configured to actuate at least one brake element (240) and at least one adjustment member (130) configured to adjust a position of the at least one second member (120) via a method of adjustment.

15 Claims, 4 Drawing Sheets

ADJUSTABLE LEVER OF A TOURBILLON MECHANISM AND A METHOD OF ADJUSTMENT

CROSS REFERENCE TO RELATED APPLICATIONS

This application is claiming priority based on European Patent Application No. 20202613.4 filed on Oct. 19, 2020, the disclosure of which is incorporated herein in its entirely by reference.

TECHNICAL FIELD

The present invention and disclosure relates to a movement of a watch, e.g. of a wristwatch comprising a tourbillon unit and further comprising a balance stop mechanism. In particular, it relates to an adjustable lever of a tourbillon mechanism and a method of adjustment.

STATE OF THE ART

Some timepieces have a setting device for setting the hands of the timepiece and a circular balance wheel, which can be pivoted about a pivot pin.

In some cases, the balance wheel is arrested by a spring arm, which is pivoted for abutment against the balance wheel, and, following completion of the operation of setting the hands, the act of pivoting the spring arm away from the balance wheel releases the latter again from its arrested state.

It is not possible to use such an arresting action of the balance wheel in timepieces with a tourbillon, since the brake force may be to strong or to soft. Therefore there is a need to provide a tourbillon which easily allows the pivoting movement of the balance wheel to be blocked when a setting device of the timepiece is actuated without to be too loose or too strong.

Indeed, if the force applied on balance wheel is too loose, the tourbillon may move further and damage the mechanism and if the force applied is too strong, the tourbillon may be displaced.

SUMMARY OF THE INVENTION

It is a particular aim of the present invention and disclosure to provide an adjustable lever of a tourbillon mechanism for stopping at least one tourbillon unit; said adjustable lever comprising at least one:

- first member: said at least one first member configured to be actuated;
- second member: said at least one second member configured to actuate at least one brake element;
- adjustment member: said at least one adjustment member configured to adjust a position of said at least one second member with respect to said at least one first member between a first position and a second position and/or to adjust a position of said at least one first member with respect to said at least one second member between a first position and a second position.

Thus, this configuration allows adjusting the brake force of said at least one brake element via said adjustable lever.

According to an embodiment, said adjustable lever comprises at least one axis of rotation between said at least one first member and said at least one second member, on said at least one first member and/or on said at least one second member; said at least one first member and/or said at least one second member is or are mobile in rotation around said at least one axis of rotation.

Thus, this configuration allows adjusting the brake force of said at least one brake element when said adjustable lever rotates around said at least one axis of rotation.

According to an embodiment, said at least one adjustment member is at least one first screw, preferably at least one first eccentric screw; said at least one first screw, preferably said at least one first eccentric screw comprises a first head.

Thus, this configuration allows adjusting the brake force of said at least one brake element by moving said at least one adjustment member and preferably by screwing said at least one first eccentric screw.

According to an embodiment, said adjustable lever comprises at least one first hole and at least one fixation element configured to cooperate with said at least one first hole and to settle said at least one second member with respect to said at least one first member in an adjusted position between said first position and said second position and/or to settle said at least one first member with respect to said at least one second member in an adjusted position between said first position and said second position.

Thus, this configuration allows adjusting the brake force of said at least one brake element and settling said adjusted position.

According to an embodiment, said at least one first hole comprises a first extremity and a second extremity; in said first position, said at least one adjustment member is closer from said first extremity than said second extremity and in said second position, said at least one adjustment member is closer from said second extremity than said first extremity.

According to an embodiment, said at least one first hole is disposed on said at least one adjustment member, and preferably said at least one first hole has an oblong shape.

According to an embodiment, at least one fixation element comprises at least one second screw and at least one second hole.

Thus, one of those configurations allow adjusting the brake force of said at least one brake element and settling said adjusted position.

According to an embodiment, said at least one second member comprises a receiving member, preferably a receiving slot, configured to receive said at least one adjustment member, preferably said first head.

According to an embodiment, said receiving member, preferably a receiving slot, is configured to receive said at least one adjustment member, preferably said first head.

According to an embodiment, said receiving member, preferably a receiving slot, is an open-end wrench, an open-ended spanner, U-shaped opening wrench and/or an at least one adjustment member corresponding plug, preferably a first head corresponding plug.

Thus, one of those configurations allow adjusting the brake force of said at least one brake element by adjusting a position of said at least one first member and/or of said at least one second member between a first position and a second position.

According to an embodiment, said adjustable lever is a rack.

Thus, this configuration allows adjusting the brake force of said at least one brake element via said adjustable lever.

The present invention relates to at least one tourbillon unit comprising at least one adjustable lever according to an aspect of the invention. Thus, this configuration allows adjusting the brake force of said at least one brake element of said At least one tourbillon unit via said adjustable lever.

The present invention relates to a method of adjustment for adjusting a force on at least one brake element of a tourbillon mechanism; said method of adjustment comprising an adjustment of a position of said at least one second member with respect to said at least one first member between a first position and a second position and/or of a position of said at least one first member with respect to said at least one second member between a first position and a second position via at least one adjustment member.

Thus, this method of adjustment allows adjusting the brake force of said at least one brake element via said adjustable lever.

According to an embodiment, said method of adjustment comprises a fixing said at least one first member to said at least one second member and/or said at least one second member to said at least one first member after said Adjustment of a position.

Thus, this method of adjustment allows adjusting the brake force of said at least one brake element and fixing said position between a first position and a second position.

BRIEF DESCRIPTION OF THE DRAWINGS

The foregoing and other purposes, features, aspects and advantages of the invention will become apparent from the following detailed description of the embodiments, given by way of illustration and not limitation with reference to the accompanying drawings, in which.

DESCRIPTION OF THE INVENTION

Figure 1:
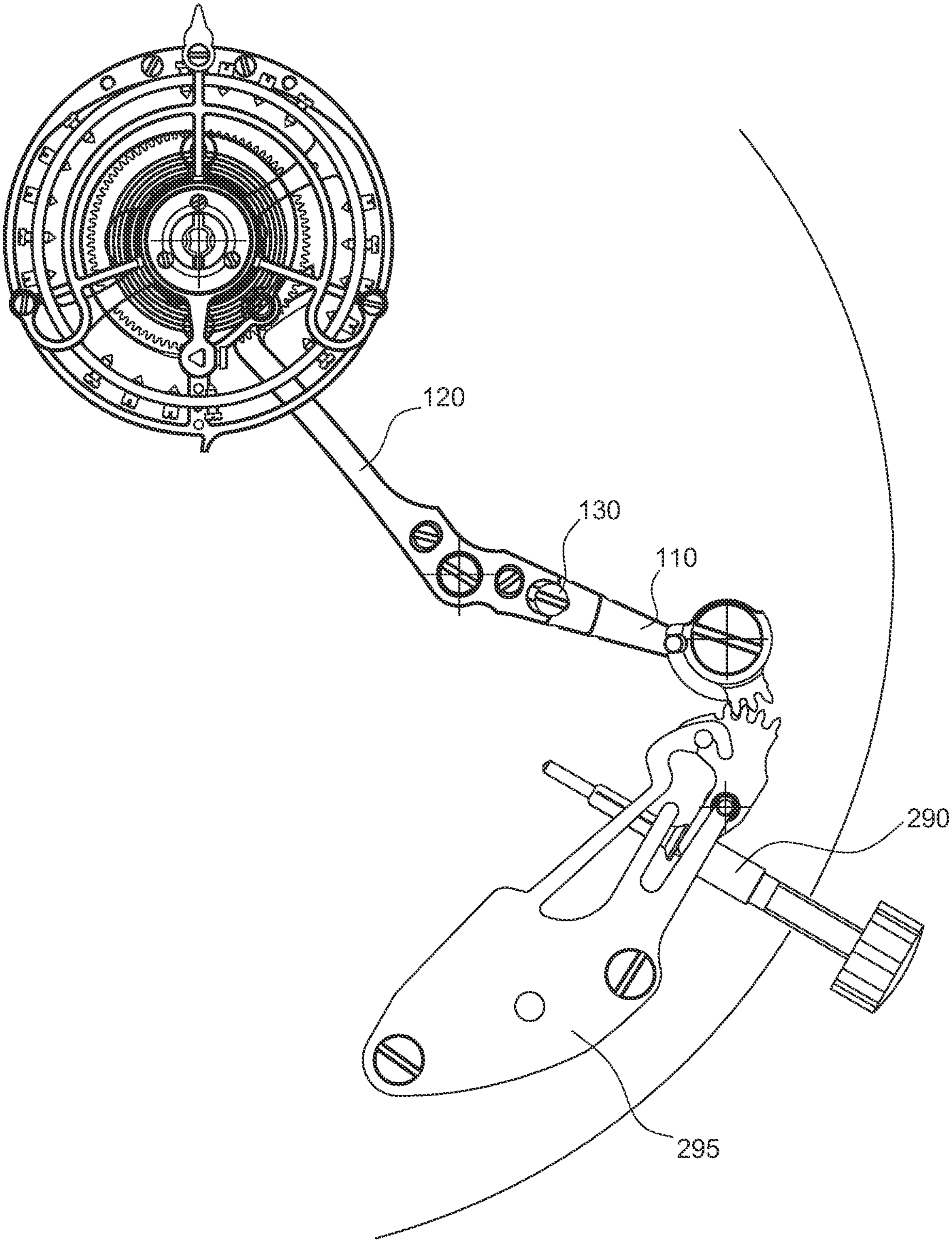
FIGS. 1 and 2 illustrate movement comprises at least one tourbillon block 271 and at least one tourbillon unit 200
Figure 2:
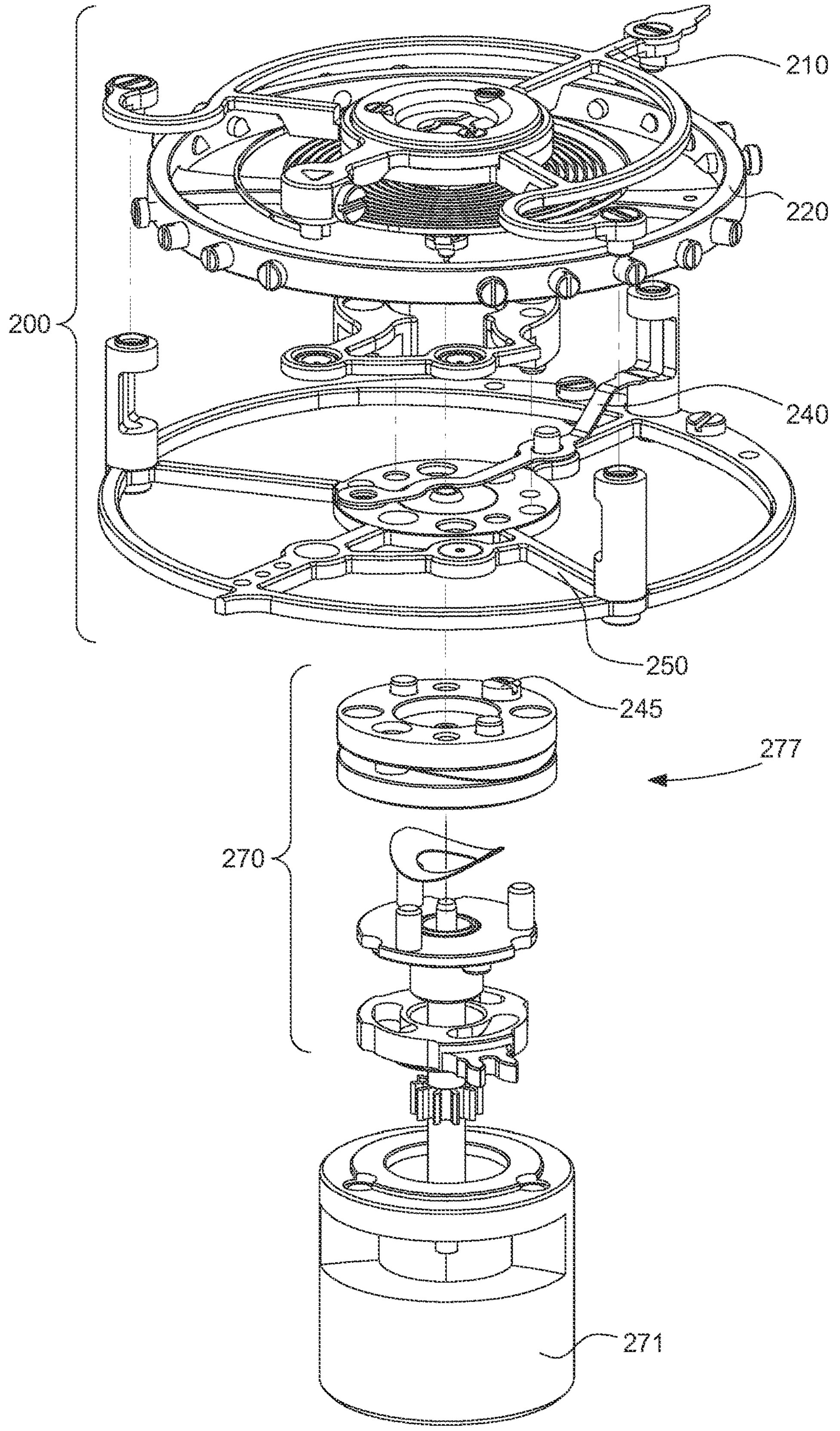

In FIGS. 1 and 2 a movement is illustrated. The movement comprises at least one tourbillon block 271 and at least one tourbillon unit 200. Said at least one tourbillon unit 200 comprises at least one balance wheel 220 rotationally mounted on at least one carriage 250. Said at least one balance wheel 220 may be in engagement with an escape wheel (not represented). Said at least one carriage 250 is further provided with at least one seconds hand 210 configured to illustrate the seconds on a dial for example.

There is further provided at least one clutch 277 rotationally coupled or rotationally fixed to said at least one carriage 250, and at least one transfer element 245. Said at least one transfer element 245 is axially displaceable or guided in or by at least one clutch 277.

When said at least one clutch 277 is actuated, the respective movement of said at least one clutch 277 is transferred to said at least one transfer element 245.

In this way, said at least one transfer element 245 is configured to urge against at least one brake element 240 thus leading to an axial displacement or axial deformation of said at least one brake element 240. In this way, said at least one brake element 240 which is arranged on said at least one carriage 250 is axially displaceable or deformable from a released position or a released state into a braking position or braking state in which said at least one brake element 240 axially engages with an outer rim of said at least one balance wheel 220. In this way, said at least one brake element 240 is configured to apply a braking torque or brake force to said at least one balance wheel 220 and to stop or to hinder said at least one balance wheel 220 from rotating or oscillating.

The standstill of at least one at least one tourbillon unit 200 may be critical since the brake force on said at least one at least one tourbillon unit 200 should be measured out such as the balance wheel 220 may be blocked when a setting device of the timepiece may be actuated without to be too loose which may cause Indeed, if the force applied on balance wheel 220 may be too loose, said at least one tourbillon unit 200 may move further and damage the mechanism and if the force applied may be too strong, said at least one tourbillon unit 200 may be displaced, the mechanism may be damage as well.

In order to achieve the standstill of a balance wheel 220, said at least one at least one tourbillon unit 200, according one aspect of the invention, may comprise at least one brake element 240 and at least one adjustable lever 100, preferably at least one rack 100, of a tourbillon mechanism for stopping said at least one at least one tourbillon unit 200.

As depicted in FIG. 1, said at least one adjustable lever 100 may comprise at least one first member 110 configured to be actuated via at least one pull-out piece 295, at least one second member 120 configured to actuate said at least one brake element 240, and at least one adjustment member 130.

Said at least one adjustment member 130 may be configured to adjust a position of said at least one second member 120 with respect to said at least one first member 110 between a first position 101 and a second position 102 and/or to adjust a position of said at least one first member 110 with respect to said at least one second member 120 between a first position 101 and a second position 102. Since, said at least one second member 120 may be adjusted with respect to said at least one first member 110 or vice versa, the brake force of said at least one brake element 240 may be measured out.

Figure 3:
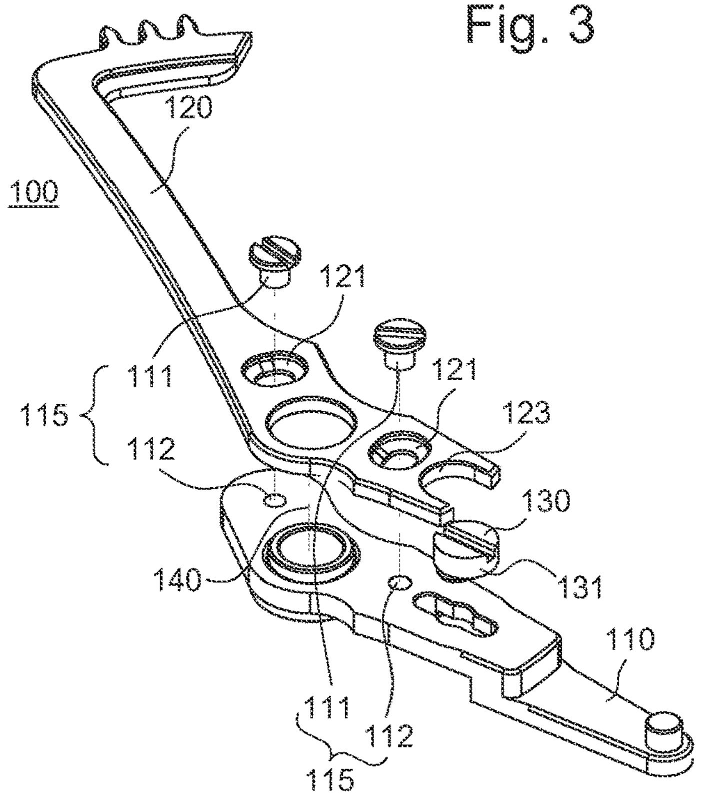
FIG. 3 represents an exploded of at least one adjustable lever 100 according to an embodiment.
Figure 4:
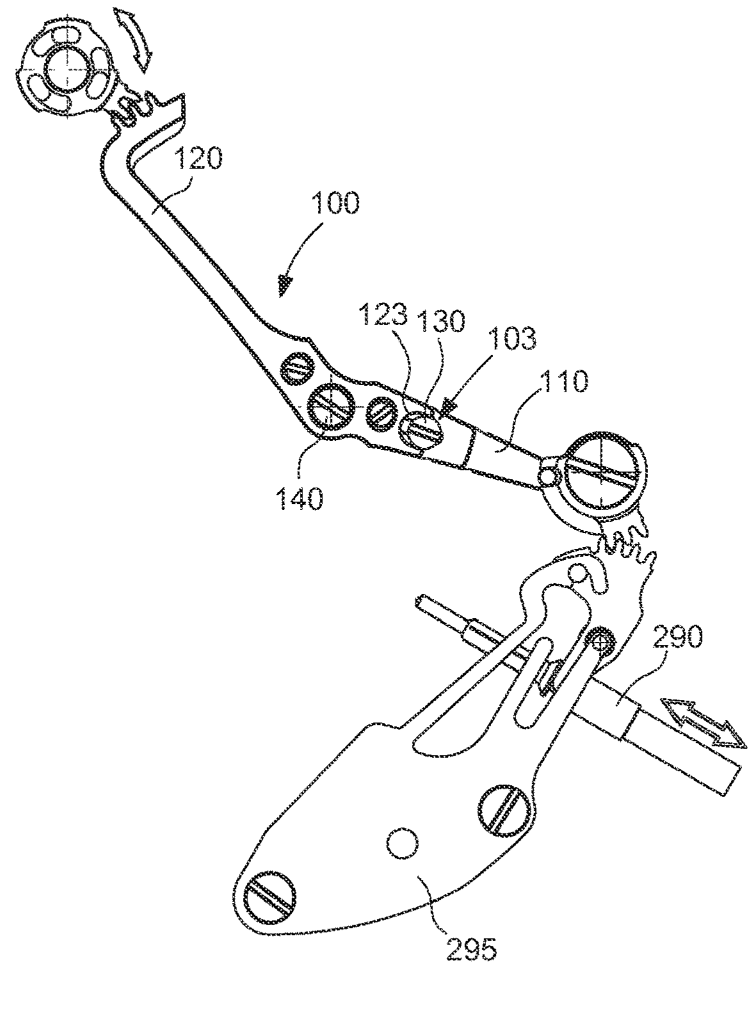
FIG. 4 illustrates said at least one adjustable lever 100 actuated via at least one winding-mechanism 290 according to an embodiment; and, FIGS. 5 and 6 represent at least one adjustment member 130 adjusting at least one second member 120 with respect to at least one first member 110 between a first position 101 and a second position 102 according to an embodiment.
Figure 5:
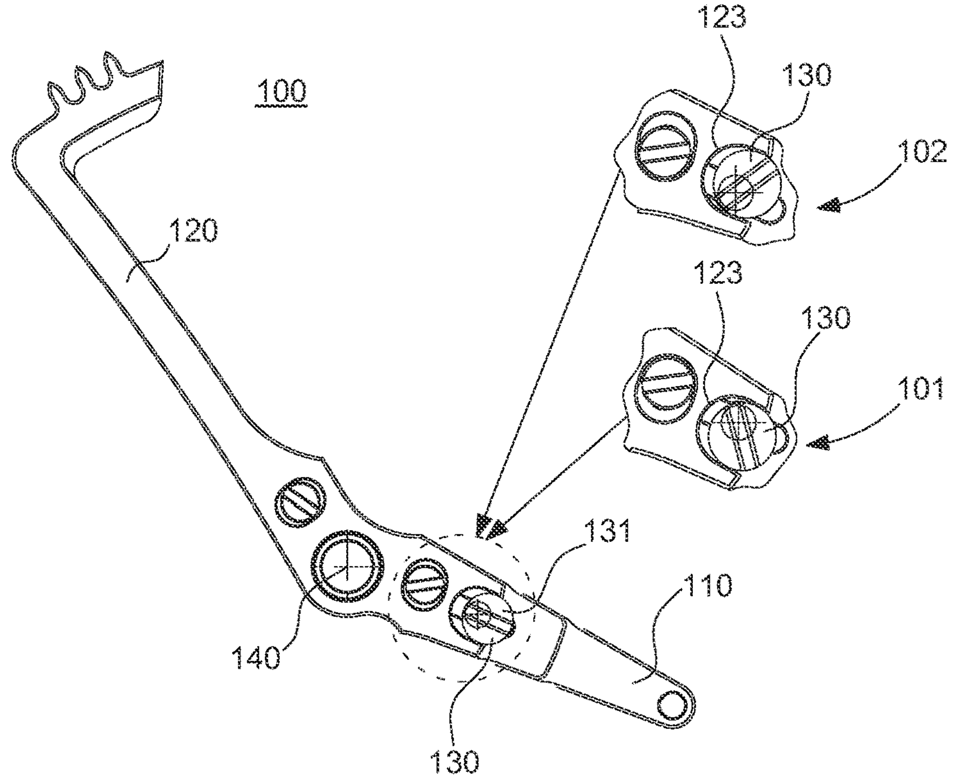
Figure 6:
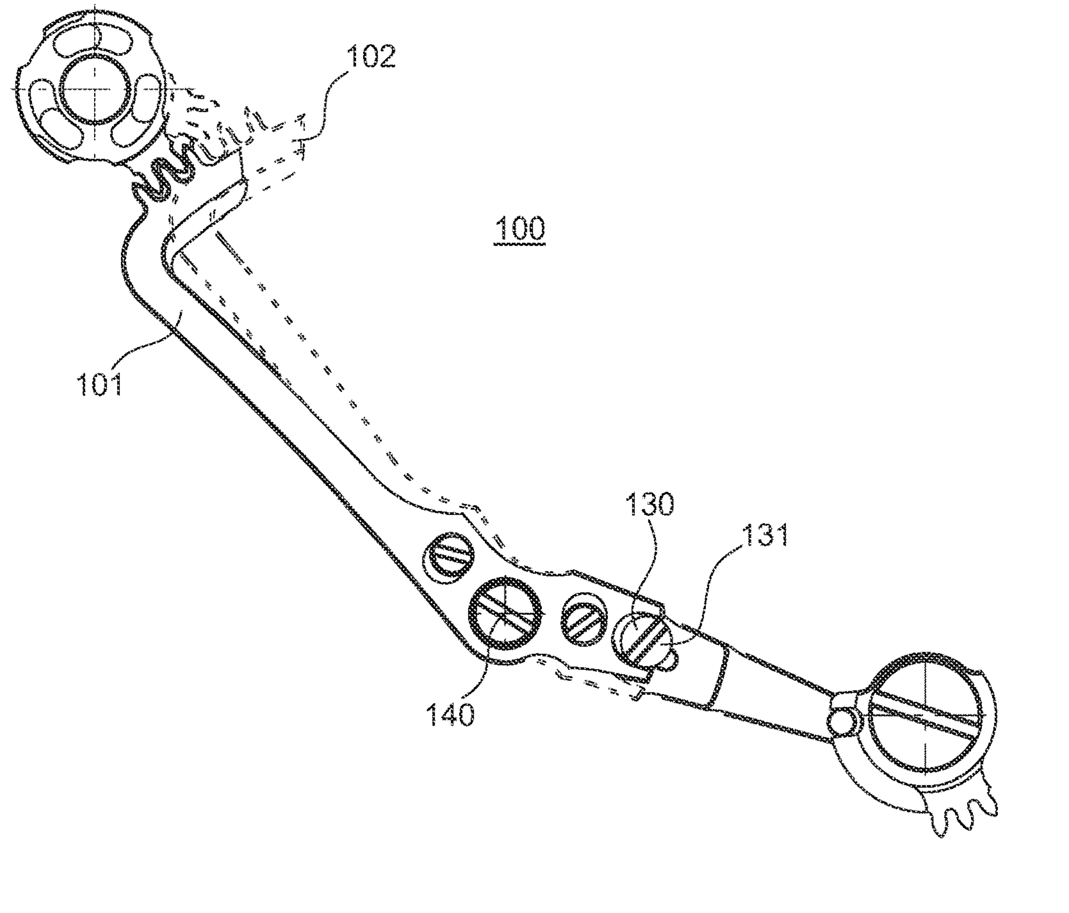

This adjustment may be achieved thanks at least one method of adjustment allowing said adjustment of said force said on at least one brake element 240 of a tourbillon mechanism. Said method of adjustment may comprise an adjustment of a position of said at least one second member 120 with respect to said at least one first member 110 between a first position 101 and a second position 102 and/or of a position of said at least one first member 110 with respect to said at least one second member 120 between a first position 101 and a second position 102 via at least one adjustment member 130, as illustrated in FIGS. 3 and 4.

In particularly, in order to achieve said adjustment between said at least one second member 120 and said at least one first member 110, said adjustable lever 100 may comprise at least one axis of rotation 140 between said at least one first member 110 and said at least one second member 120 or said adjustable lever 100 may comprise at least one axis of rotation 140 on said at least one first member 110 and/or on said at least one second member 120, as depicted in FIG. 1, and said at least one first member 110 and/or said at least one second member 120 may be mobile in rotation around said at least one axis of rotation 140.

Thus, this configuration allows adjusting the brake force of said at least one brake element 240 when said adjustable lever 100 rotates around said at least one axis of rotation 140.

This adjustment is realized through said at least one adjustment member 130, which may be at least one first screw 130, preferably at least one first eccentric screw 130, having a first head 131.

As shown in FIGS. 1 and 3-4, said at least one second member 120 may comprise a receiving member 123, preferably a receiving slot 123, configured to receive said at least one adjustment member 130, preferably said first head 131. More specifically, said receiving member 123, preferably said receiving slot 123, may be an open-end wrench 123, an open-ended spanner 123, U-shaped opening wrench 123 and/or an at least one adjustment member corresponding plug 123, preferably a first head corresponding plug 123.

As depicted in FIG. 2, when at least one winding-mechanism 290 is pulled out, said at least one pull-out piece 295 meshes said at least one first member 110. In order to adjust the brake force of said at least one brake element 240, said at least one adjustment member 130 may be turned and/or screwed in and/or on said at least one first member 110, said first head 131 may move in said receiving member 123 and may displace said at least one second member 120 with respect to said at least one first member 110, for example, until said brake force is measured out, rather said at least one brake element 240 brings to standstill said at least one at least one tourbillon unit 200.

This two extreme positions, e.g. said first position 101 and said second position 102, are illustrated in FIG. 3. Indeed, said first head 131 may have at least one groove oriented at $+\pi/4$ for said second position 102 and said at least one groove may be oriented at $-\pi/4$ for said first position 101 for example.

When the brake force of said at least one brake element 240 is adjusted, said method of adjustment may comprise a fixing of said at least one first member 110 to said at least one second member 120 and/or said at least one second member 120 to said at least one first member 110.

Indeed, said adjustable lever 100 may comprise at least one first hole 121 and at least one fixation element 115, comprising at least one second screw 111 and at least one second hole 112. Said at least one fixation element 115, configured to cooperate with said at least one first hole 121, may be configured to settle said at least one second member 120 with respect to said at least one first member 110 in an adjusted position 103 between said first position 101 and said second position 102 by fixing of said at least one second member 120 to said at least one first member 110. Alternatively, it may be possible to settle said at least one first member 110 with respect to said at least one second member 120 in an adjusted position 103 between said first position 101 and said second position 102 by fixing said at least one first member 110 to said at least one second member 120.

In FIG. 3, said at least one first hole 121, preferably having an oblong shape, may be disposed on said at least one second member 120 and said at least one first hole 121 may comprise a first extremity 127 and a second extremity 128, and in said first position 101, said at least one adjustment member 130 may be closer from said first extremity 127 than said second extremity 128 and in said second position 102, said at least one adjustment member 130 may be closer from said second extremity 128 than said first extremity 127.

The invention claimed is:

1. An adjustable lever of a tourbillon mechanism for stopping at least one tourbillon unit; said adjustable lever comprising at least one:

a first member, said at least one first member configured to be actuated;

a second member, said at least one second member configured to actuate at least one brake element;

an adjustment member, said at least one adjustment member configured to adjust a position of said at least one second member with respect to said at least one first member between a first position and a second position and/or to adjust a position of said at least one first member with respect to said at least one second member between the first position and the second position; and at least one axis of rotation intersecting both said at least one first member and said at least one second member, said at least one first member and/or said at least one second member is or are mobile in rotation around said at least one axis of rotation.

2. The adjustable lever according to claim 1, wherein said at least one adjustment member is at least one first screw and said at least one first screw comprises a first head.

3. The adjustable lever according to claim 1, comprising at least one first hole and at least one fixation element configured to cooperate with said at least one first hole and to settle said at least one second member with respect to said at least one first member in an adjusted position between said first position and said second position and/or to settle said at least one first member with respect to said at least one second member in an adjusted position between said first position and said second position.

4. The adjustable lever according to claim 3, wherein said at least one first hole comprises a first extremity and a second extremity; in said first position, said at least one adjustment member is closer from said first extremity than said second extremity and in said second position, said at least one adjustment member is closer from said second extremity than said first extremity.

5. The adjustable lever according to claim 3, wherein said at least one first hole is disposed on said at least one adjustment member and has an oblong shape.

6. The adjustable lever according to claim 3, wherein the at least one fixation element comprises at least one second screw and at least one second hole.

7. The adjustable lever according to claim 2, wherein said at least one second member comprises a receiving member configured to receive said at least one adjustment member.

8. The adjustable lever according to claim 7, wherein said receiving member is an open-end wrench, an open-ended spanner, U-shaped opening wrench and/or an at least one adjustment member corresponding plug.

9. The adjustable lever according to claim 1, wherein said adjustable lever is a rack.

10. At least one tourbillon unit comprising at least one adjustable lever according to claim 1.

11. A method of adjustment for adjusting a force on at least one brake element of a tourbillon mechanism; said method of adjustment comprising an:

adjusting a position of at least one second member of an adjustment lever with respect to at least one first member of said adjustment lever between a first position and a second position and/or of a position of said at least one first member with respect to said at least one second member between the first position and the second position via at least one adjustment member, wherein said adjustment lever comprises at least one axis of rotation intersecting both said at least one first member and said at least one second member, said at least one first member and/or said at least one second member is or are mobile in rotation around said at least one axis of rotation.

12. The method of adjustment according to claim 11, which comprises a fixing said at least one first member to said at least one second member and/or said at least one second member to said at least one first member after said Adjustment of a position.

13. The adjustable lever according to claim 2, wherein said at least one first screw is an eccentric screw.

14. The adjustable lever according to claim 7, wherein said receiving member is a receiving slot and said receiving slot is configured to receive said first head.

15. The adjustment lever according to claim 8, wherein the at least one adjustment member corresponding plug is a first head corresponding plug.

* * * * *